United States Patent
Rod et al.

(10) Patent No.: US 11,018,560 B2
(45) Date of Patent: May 25, 2021

(54) METHODS CIRCUITS DEVICES SYSTEMS AND FUNCTIONALLY ASSOCIATED MACHINE EXECUTABLE CODE FOR POWERING A MACHINE MONITORING UNIT

(71) Applicant: Shiratech Solution LTD, Petach Tikva (IL)

(72) Inventors: Itay Rod, Vehud Monosson (IL); Yaniv Rod, Kiryat Ono (IL)

(73) Assignee: SHIRATECH SOLUTION LTD., Petach Tikva (IL)

( * ) Notice: Subject to any disclaimer, the term of this patent is extended or adjusted under 35 U.S.C. 154(b) by 0 days.

(21) Appl. No.: 16/601,791

(22) Filed: Oct. 15, 2019

(65) Prior Publication Data

US 2021/0036585 A1    Feb. 4, 2021

Related U.S. Application Data

(63) Continuation-in-part of application No. 16/575,547, filed on Sep. 19, 2019, now abandoned.

(60) Provisional application No. 62/882,535, filed on Aug. 4, 2019.

(51) Int. Cl.
| | | |
|---|---|---|
| *G01D 11/24* | (2006.01) | |
| *H02K 11/35* | (2016.01) | |
| *H02K 11/00* | (2016.01) | |
| *H02K 11/33* | (2016.01) | |

(52) U.S. Cl.
CPC ......... *H02K 11/35* (2016.01); *H02K 11/0094* (2013.01); *H02K 11/33* (2016.01)

(58) Field of Classification Search
CPC ..... H02K 11/35; H02K 11/0094; H02K 11/33
See application file for complete search history.

(56) References Cited

U.S. PATENT DOCUMENTS

| | | | | |
|---|---|---|---|---|
| 2010/0049377 A1* | 2/2010 | Scheid | ................... | G01D 21/00 701/3 |
| 2012/0267988 A1* | 10/2012 | Hassel | ................... | H02K 5/225 310/68 B |
| 2014/0130587 A1* | 5/2014 | Von Herzen | ....... | G01N 33/2888 73/114.55 |

* cited by examiner

*Primary Examiner* — Muhammad S Islam
(74) *Attorney, Agent, or Firm* — The Roy Gross Law Firm, LLC; Roy Gross

(57) ABSTRACT

Disclosed are methods, circuits, devices, systems and functionally associated machine executable code for powering a machine monitoring unit. A machine monitoring unit (MMU) monitors operational parameters of a machine during operation. A set of machine emissions sensors, convert a machine emission of a specific type, generated by the machine during machine operation, into an electric signal containing information about one or more characteristics of the respective converted emission. Communication circuits to enable communication of the information within the signal to another device. A machine emission energy harvester harvests and converts energy emissions from the monitored machine into electric energy suitable to provide power for operation of the MMU.

6 Claims, 12 Drawing Sheets

METHODS CIRCUITS DEVICES SYSTEMS AND FUNCTIONALLY ASSOCIATED MACHINE EXECUTABLE CODE FOR POWERING A MACHINE MONITORING UNIT

RELATED APPLICATIONS SECTION

The present application is a continuation in part (CIP) application of U.S. Utility patent application Ser. No. 16/575,547, filed Sep. 19, 2019. The present application also claims priority from: U.S. Provisional Patent Application No. 62/882,535, filed Aug. 4, 2019, which application is hereby incorporated by reference in its entirety.

FIELD OF THE INVENTION

The present invention generally relates to the field of motor and machine condition monitoring. More specifically, the present invention relates to methods, circuits, devices, systems and functionally associated machine executable code for powering a machine monitoring unit.

BACKGROUND

At present, most motors simply run until they fail. This may cause a number of problems, such as downtime, secondary damage to other equipment, poor quality, lost production and, in some cases, even security issues.

When a machine is not working as expected/planned, it will usually generate/cause sensible outputs—such as vibrations, sounds, temperature, electromagnetic fields and the like—than it does when operating normally.

There remains a need, in the field of motor and machine condition monitoring, for multi aspect machine performance monitoring solutions for the detection and prediction of machine malfunctions and for the powering of machine monitoring units.

SUMMARY OF THE INVENTION

Embodiments of the present invention may include methods, circuits, devices, systems and functionally associated machine executable code for powering a machine monitoring unit.

According to embodiments of the present invention, there may be provided a Motor Monitoring Device/Unit ("MMD") with a housing or frame configured for coupling to, or in proximity to, a motor of interest and sensors to monitor dynamic parameters of a motor during operation. The MMD may be integral with the motor of interest. The MMD may be used to monitor various electromechanical devices other than just motors. Accordingly, the MMD may also be referred to generically as a Machine Monitoring Unit ("MMU").

According to some embodiments of the present invention, the machine monitoring unit (MMU) may monitor one or more operational parameters of a machine of a specific machine type during operation.

According to some embodiments, the MMU may include a set of machine emissions sensors, each of which sensors may be configured to convert a machine emission of a specific type and generated by the machine during machine operation, into an electric signal containing information about one or more characteristics of the respective converted emission.

According to some embodiments, the MMU may include communication circuits to enable communication of the information within the signal about one or more characteristics of the respective converted emission to another device.

According to some embodiments, the MMU may include a machine emission energy harvester configured to harvest and convert energy emissions from the monitored machine into electric energy suitable to provide power for MMU operation.

An MMU in accordance with embodiments may include a processing circuitry and one or more sensors selected from the set of sensors including: (a) multi-axis vibration sensors; (b) acoustic sensors; (c) thermal sensors; (d) electromagnetic field sensors; (e) voltage sensors; (f) electric current sensors; (g) machine/motor rotation (e.g. RPM) sensor.

An MMU in accordance with embodiments may include digital data storage and the communication circuits for buffering and conveying data relating to sensed machine/motor parameters to a remote location.

The MMU may use the communication circuits to send regularly scheduled reports about the operation of a machine/motor of interest.

The MMU may use the communication circuits to send event related, condition related and/or power consumption/remaining/charging-rate related notifications triggered by detection of an event or condition relevant to the operation of the machine/motor of interest and/or the MMU monitoring it.

The MMU may include a multi-factor machine/motor condition classifier which may, based on factoring of multiple sensor outputs from one or more sensor of the same of different types, generate a machine/motor condition notification for the machine/motor of interest.

BRIEF DESCRIPTION OF THE DRAWINGS AND APPENDIXES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings:

Figure 3A:
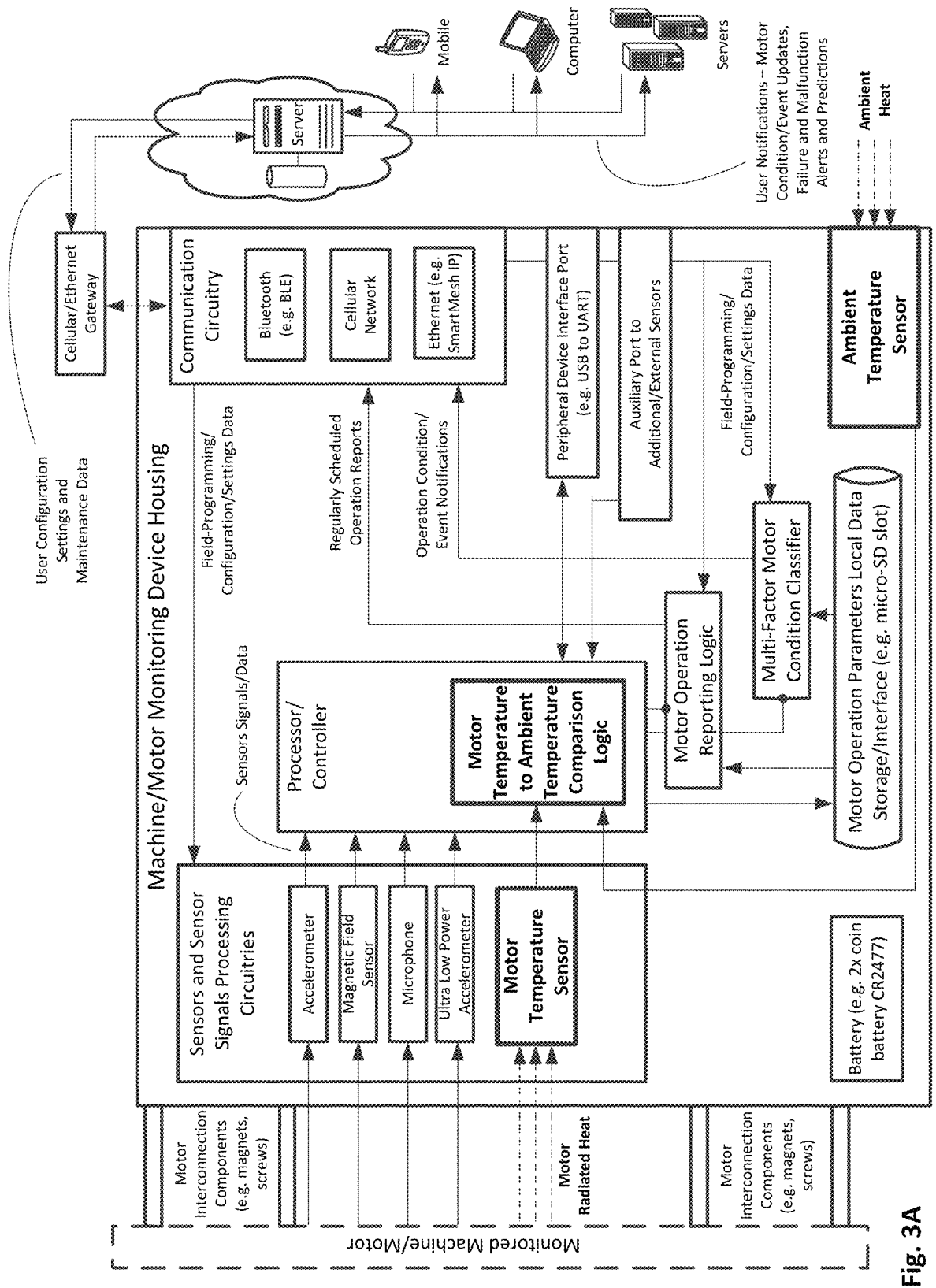
FIG. 3A, is a block diagram of an exemplary system for monitoring performance and health of a machine/motor and for powering a machine monitoring unit, in accordance with some embodiments of the present invention, wherein a thermal sensor measures machine/motor temperature and another thermal sensor measures the ambient temperature in the environment of the, machine/motor.
Figure 3B:
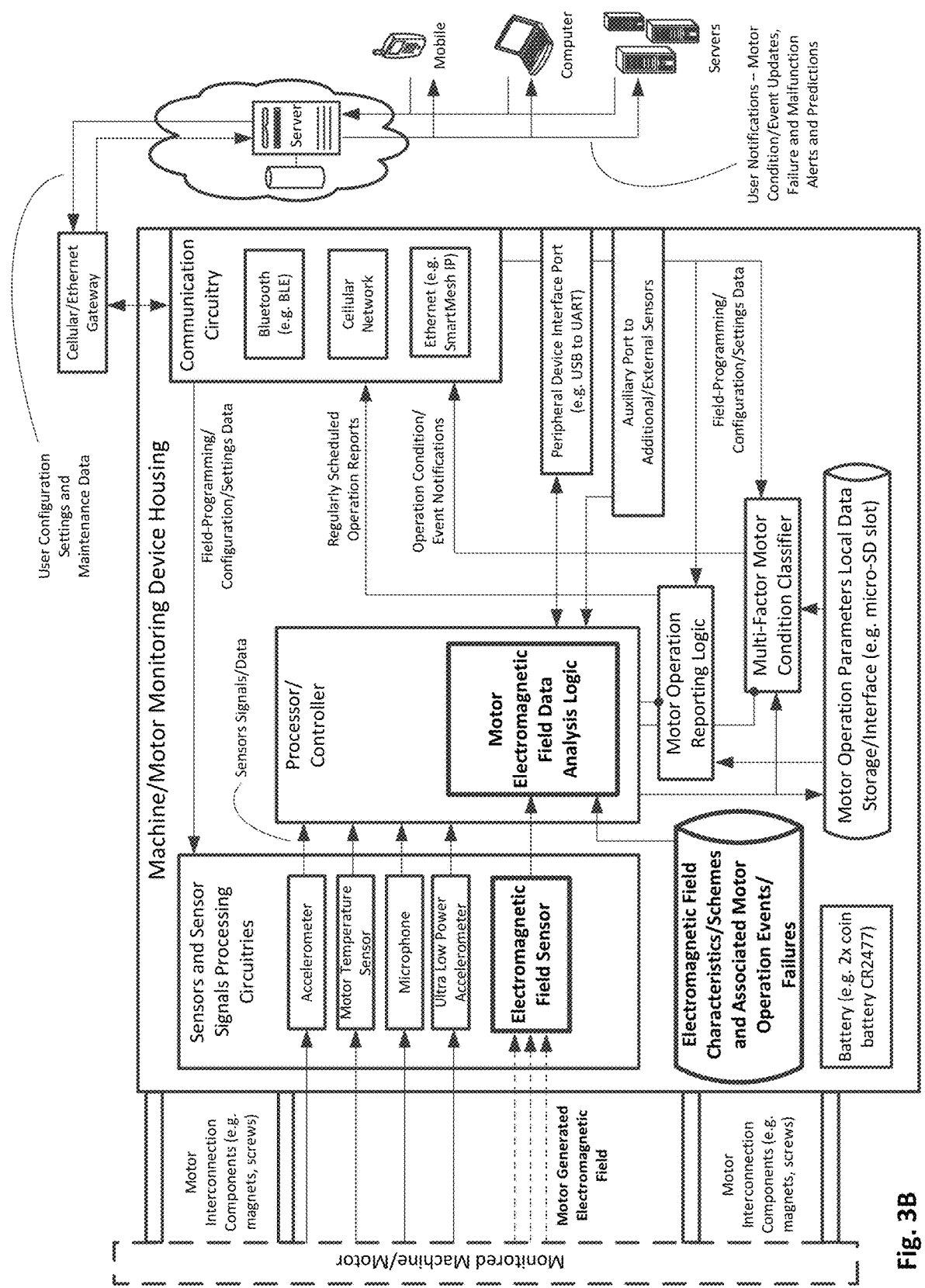
FIG. 3B, is a block diagram of an exemplary system for monitoring performance and health of a machine/motor and for powering a machine monitoring unit, in accordance with some embodiments of the present invention, wherein an electromagnetic field sensor measures the strengths and/or orientations of electromagnetic field(s) generated as part of the monitored machine's/motor's operation.
Figure 3C:
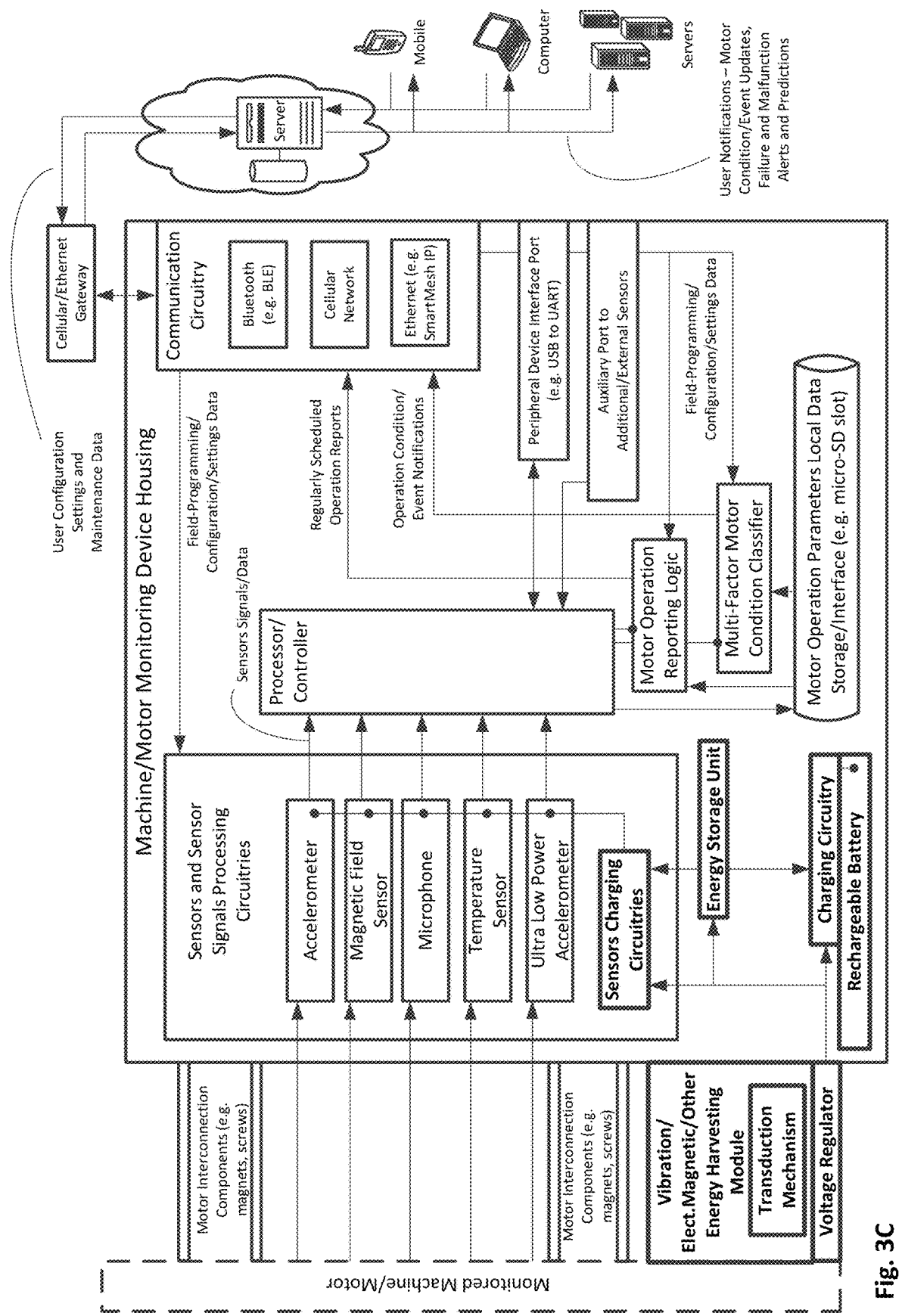
Figure 4A:
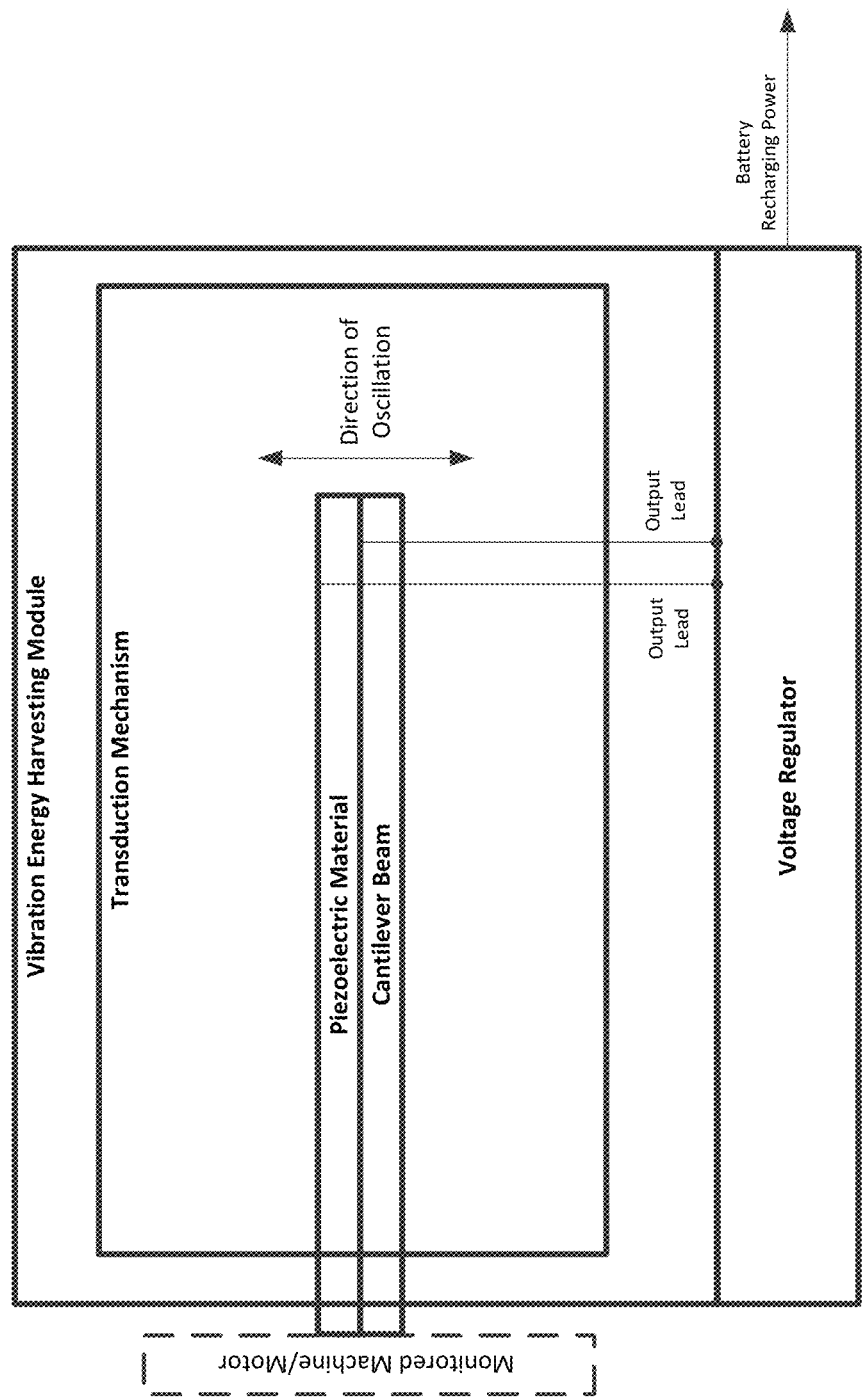
Figure 4B:
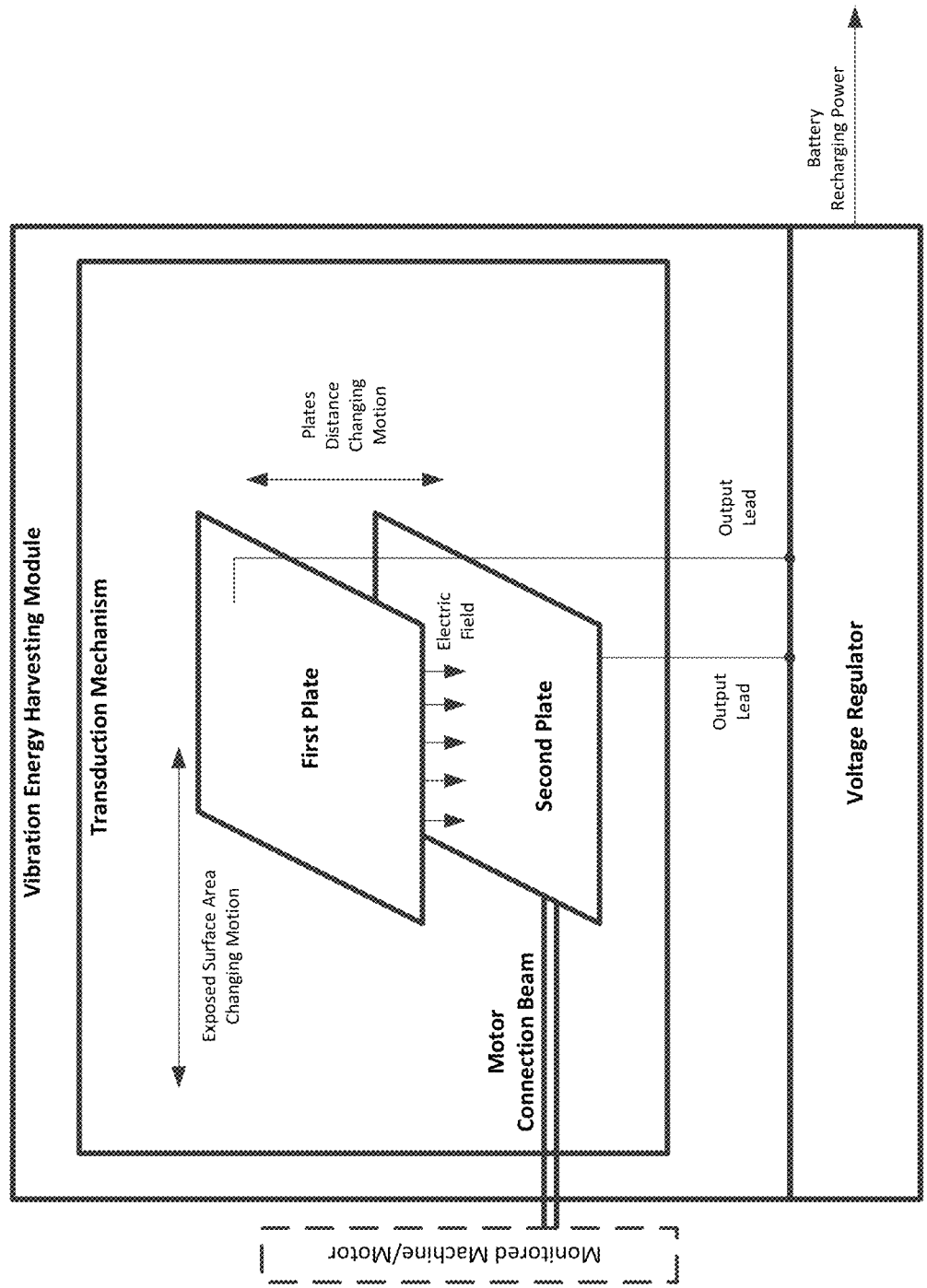
Figure 4C:
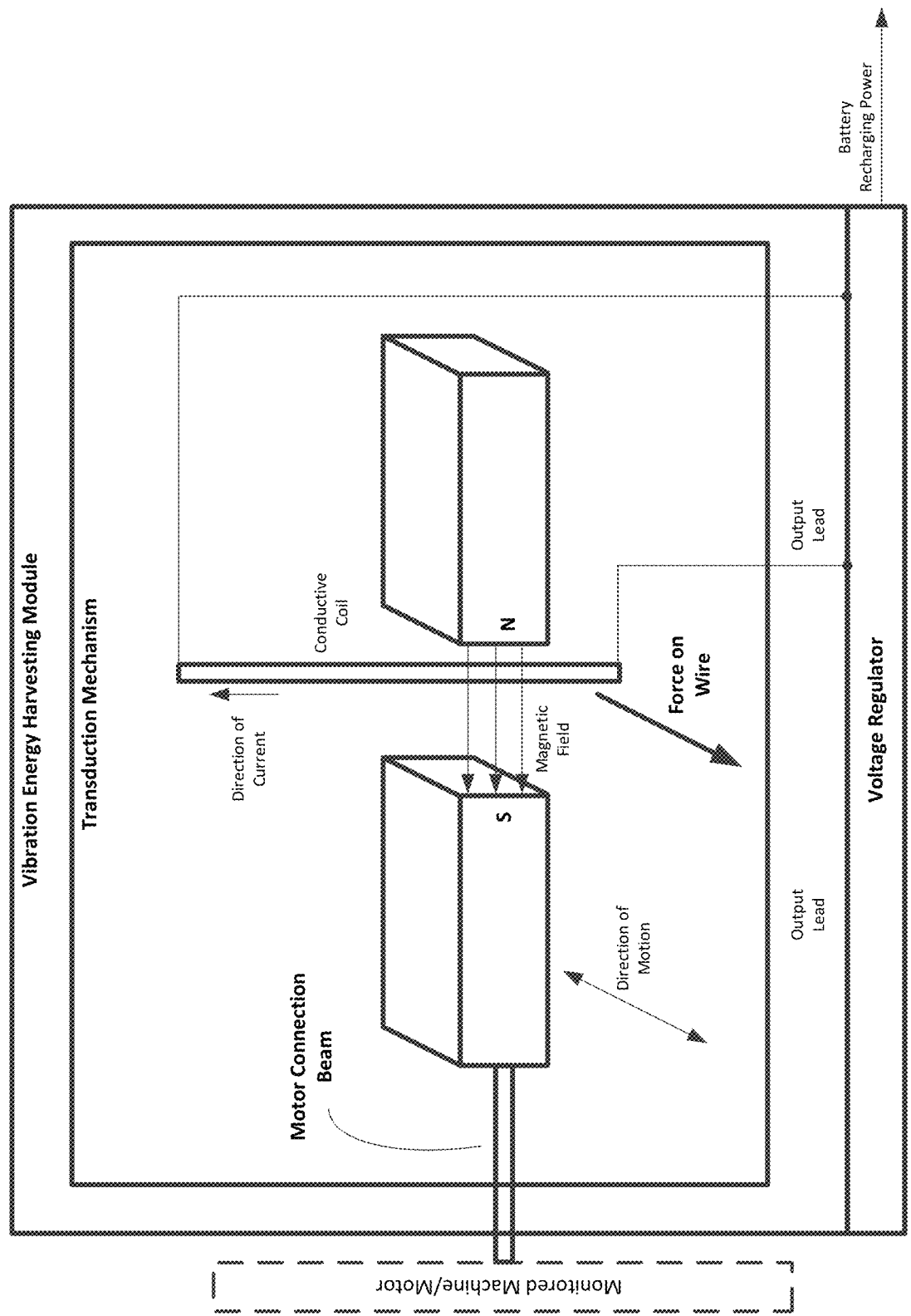
Figure 4D:
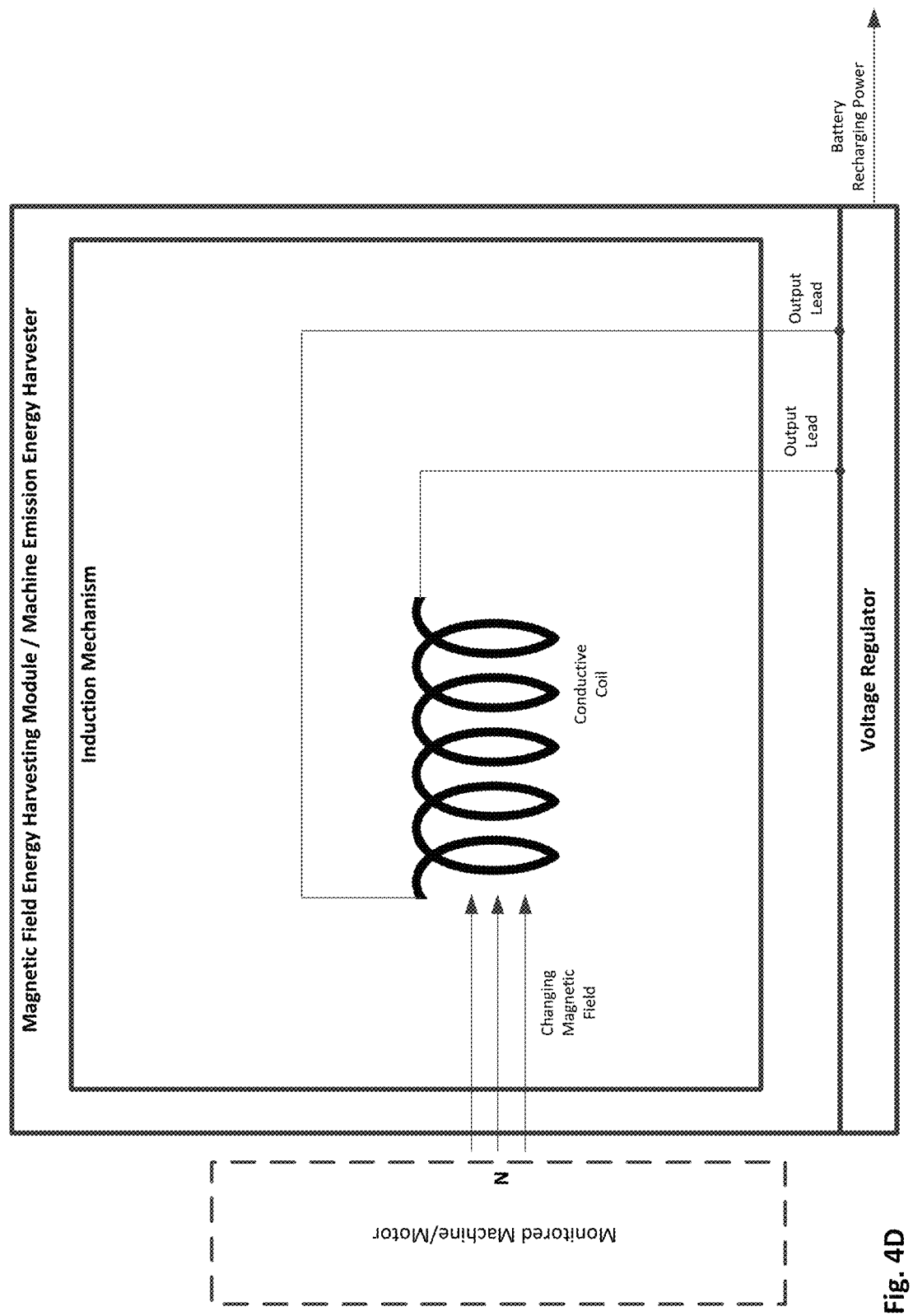
Figure 5A:
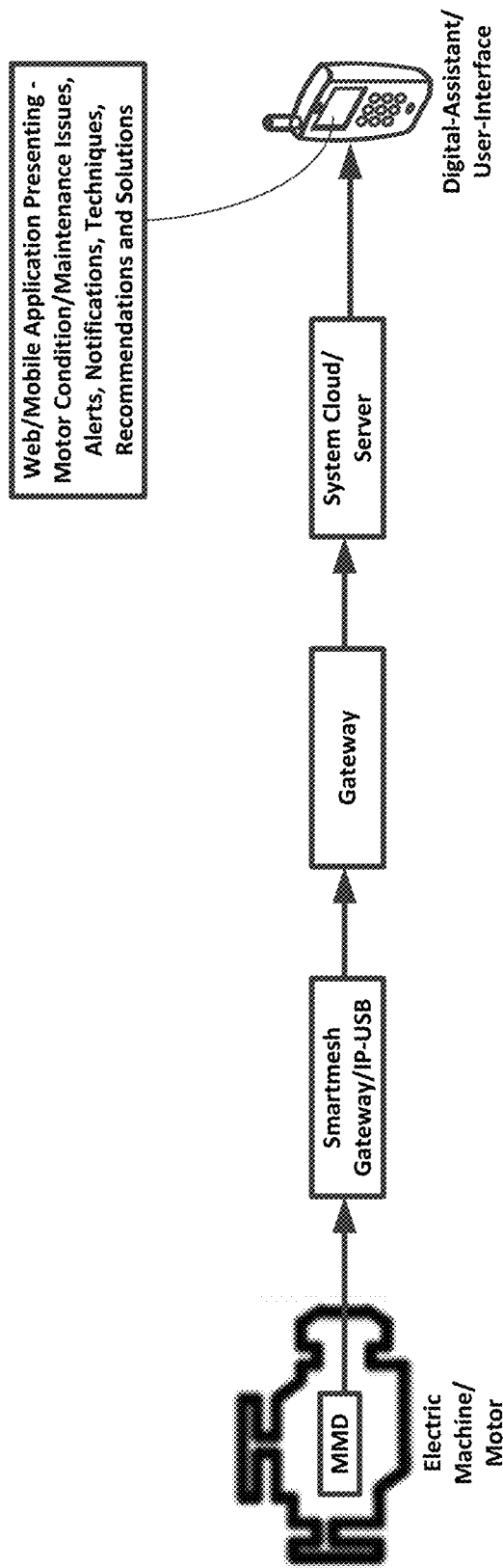
Figure 5B:
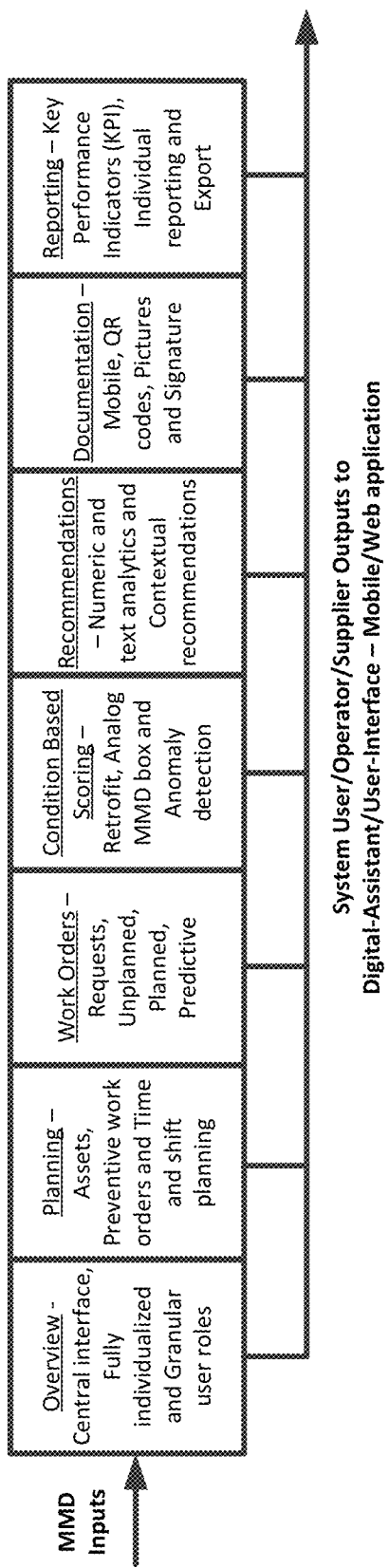

FIG. 3C, is a block diagram of an exemplary system for monitoring performance and health of a machine/motor and for powering a machine monitoring unit, in accordance with some embodiments of the present invention, wherein a vibration energy harvesting module utilizes machine/motor operation associated kinetic vibration energy to electrically charge the MMD's battery and batteries powering its specific sensors;

FIG. 4A, is a block diagram of a first exemplary transduction mechanism, in accordance with some embodiments of the present invention;

FIG. 4B, is a block diagram of a second exemplary transduction mechanism, in accordance with some embodiments of the present invention;

FIG. 4C, is a block diagram of a third exemplary transduction mechanism, in accordance with some embodiments of the present invention;

FIG. 4D, is a block diagram of an exemplary induction mechanism, in accordance with some embodiments of the present invention;

FIG. 5A, shows a schematic block diagram of an exemplary system setup executing/implementing exemplary operation scenarios of an exemplary system for monitoring the performance and health of a machine/motor and for powering a machine monitoring unit, in accordance with some embodiments of the present invention; and FIG. 5B, shows a schematic table listing various possible outputs of an exemplary system executing/implementing exemplary operation scenarios of an exemplary system for monitoring the performance and health of a machine/motor and for powering a machine monitoring unit, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals or element labeling may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, may refer to the action and/or processes of a computer, computing system, computerized mobile device, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In addition, throughout the specification discussions utilizing terms such as "storing", "hosting", "caching", "saving", or the like, may refer to the action and/or processes of 'writing' and 'keeping' digital information on a computer or computing system, or similar electronic computing device, and may be interchangeably used. The term "plurality" may be used throughout the specification to describe two or more components, devices, elements, parameters and the like.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device, for example a computerized device running a web-browser.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution. The memory elements may, for example, at least partially include memory/registration elements on the user device itself.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments.

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "includes", "including", "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Throughout the specification, the terms 'machine' and 'motor' may be used interchangeably to refer to a subject of monitoring of a machine monitoring unit. It is hereby made clear that A Motor Monitoring Device (MMD), or as may generically be referred to a Machine Monitoring Unit ("MMU"), may be used to monitor motors and/or various electromechanical devices other than motors and to convert energy emissions from the monitored devices into electric energy suitable to provide power for MMD/MMU operation.

The present disclosure is to be considered as an exemplification of the invention, and is not intended to limit the invention to the specific embodiments illustrated by the figures or description below.

Embodiments of the present invention may include methods, circuits, devices, systems and functionally associated machine executable code for powering a machine monitoring unit.

According to embodiments of the present invention, there may be provided a Motor Monitoring Device/Unit ("MMD") with a housing or frame configured for coupling to, or in proximity to, a motor of interest and sensors to monitor dynamic parameters of a motor during operation. The MMD may be integral with the motor of interest. The MMD may be used to monitor various electromechanical devices other than just motors. Accordingly, the MMD may also be referred to generically as a Machine Monitoring Unit ("MMU"). The terms MMD and MMU may be used herein interchangeably.

According to some embodiments of the present invention, the machine monitoring unit (MMU) may monitor one or more operational parameters of a machine of a specific machine type during operation.

According to some embodiments, the MMU may include a set of machine emissions sensors, each of which sensors may be configured to convert a machine emission of a specific type and generated by the machine during machine operation, into an electric signal containing information about one or more characteristics of the respective converted emission.

According to some embodiments, the MMU may include communication circuits to enable communication of the information within the signal about one or more characteristics of the respective converted emission to another device.

According to some embodiments, the MMU may include a machine emission energy harvester configured to harvest and convert energy emissions from the monitored machine into electric energy suitable to provide power for MMU operation.

An MMU in accordance with embodiments may include a processing circuitry and one or more sensors selected from the set of sensors including: (a) multi-axis vibration sensors; (b) acoustic sensors; (c) thermal sensors; (d) electromagnetic field sensors; (e) voltage sensors; (f) electric current sensors; (g) machine/motor rotation (e.g. RPM) sensor.

An MMU in accordance with embodiments may include digital data storage and the communication circuits for buffering and conveying data relating to sensed machine/motor parameters to a remote location.

The MMU may use the communication circuits to send regularly scheduled reports about the operation of a machine/motor of interest.

The MMU may use the communication circuits to send event related, condition related and/or power consumption/remaining/charging-rate related notifications triggered by detection of an event or condition relevant to the operation of the machine/motor of interest and/or the MMU monitoring it.

The MMU may include a multi-factor machine/motor condition classifier which may, based on factoring of multiple sensor outputs from one or more sensor of the same or different types, generate a machine/motor condition notification for the machine/motor of interest.

The MMU, in accordance with some embodiments, or the multi-factor motor condition classifier thereof, may trigger an alert notification type communication upon detection of a notable deviation of sensed emission characteristics relative to one or more reference emission characteristics.

Detection of a notable deviation of sensed emission characteristics relative to reference emission characteristics may for example include: (a) one sensed emission characteristic deviating from its corresponding reference beyond a standalone deviation threshold level associated with the sensed emission characteristic, or (b) each of a specific combination of two or more sensed characteristics deviating from their respective references beyond respective adjusted deviation threshold.

An adjusted deviation threshold, in accordance with some embodiments, may include any sensed emission characteristic deviation threshold value which is increased, decreased or eliminated from consideration—due the consideration, or the specific value(s), of one or more other emission characteristic deviation thresholds.

For example, upon an MMU/MMD temperature sensor indicating a threshold value of the machine's/motor's temperature (e.g. 100 degrees centigrade) has been reached—a respective notification may be issued. If, however, sensed machine/motor vibration frequency and/or amplitude has reached or surpassed a specific threshold value, the temperature threshold value may be decreased and a notification may be issued upon the MMU's/MMD's temperature sensor indicating that a lower threshold value of the machine's/motor's temperature (e.g. 80 degrees centigrade) has been reached.

Accordingly, one or more MMD sensors measured values may affect the notification/alert threshold values associated with one or more other MMD sensors. Multiple sets of interdependent threshold values may be generated, wherein each thresholds set collectively forms a machine/motor notification/alert triggering rule-set.

According to some embodiments, an MMD housing may be structured for containing and/or holding: a power source such as a battery; any combination of the above listed sensors; circuitry for pre-processing sensor collected signals (e.g. Analog to Digital Converters ADC); communication circuitry for relaying sensors' signals based data streams, or data derived therefrom, to a system server; and a computer processor for managing the sensors and circuitries and for processing and optionally analyzing the sensors' signals based data streams.

According to some embodiments, an MMD coupled to a machine/motor of interest may be functionally interconnected to the machine/motor by one or more physical/retaining interconnection components or elements. The interconnection components or elements may, for example, take the form of magnets or screws and may be structured and/or made of specific material or materials combination for facilitating and/or enhancing sensors' collection capabilities, for example, the elasticity level of the interconnection components may optimize the conveying of machine/motor vibrations to accelerometer sensors contained/held by the MMD's housing.

According to some embodiments, an MMD may be further interconnected to a machine/motor by a physical communication/power medium such as a cable or connector, wherein the cable or its connector may be plugged to the motor's box socket.

According to some embodiments, machine/motor monitoring sensors may be located within the MMD housing, or held thereby, at one or more positions or orientations facilitating/optimizing sensor collection abilities. For example: acoustic sensors may be directed towards noise generating elements of the monitored machine/motor; thermal sensors may be positioned, within the MMD housing, in proximity to the monitored machine/motor and/or on/at/along the outer surface of the housing—to improve their machine/motor temperature sensing abilities; and/or electric parameters associated sensors may be positioned at, or at proximity to, electric parameters change-prone locations.

According to some embodiments, sensors outputs may indicate specific values associated—with/resulting—from the operation of the machine/motor. A high, or low, value of a specific sensor may be related to a machine/motor operation condition/event. A set of high, low, or high-and-low values from multiple specific sensors outputs, may be related to a machine/motor operation condition/event. A certain change/delta in the value(s) of one or more sensors outputs occurring within a specific time length, may be related to a machine/motor operation condition/event According to some embodiments, analog sensor collected signals may be converted to digital data or to digital data streams. Derived digital data, or parts/latest-time-segments thereof, may be locally stored; and, may be locally processed to detect and/or classify specific multi-factor sensors' data based machine/motor operation condition/event scenarios. The MMD may intermittently, or on a regularly scheduled basis, generate and communicate machine/motor operation reports to a system server or a cloud data storage.

According to some embodiments, the MMD may further generate and communicate machine/motor operation condition/event notifications, upon one or more locally processed MMD sensors based data streams—including/indicating one or more values surpassing one or more respective threshold value(s) associated with a machine/motor condition (e.g. certain temperature, certain noise type/strength, certain strength of an electromagnetic field—created as a result of the monitored machine/motor's operation).

According to some embodiments, MMD communicated machine/motor operation reports, may be further processed—on the system's server or a cloud based service/platform—to detect specific sensor data values combinations, indicative of either a current machine/motor condition or event, or of a future machine/motor condition or event that is predicted based on a current sensor data value(s) combination.

According to some embodiments, data streams collected prior to the detection of a current machine/motor condition/event, may be used as training data for a computerized artificial intelligence system/model/machine, such as a neural network—in order for the model to learn data patterns, combinations and/or scenarios which indicate a high probability rate for corresponding/respective monitored machine/motor condition(s)/event(s).

According to some embodiments of the present invention, an MMD may include one or more thermal sensors for measuring machine/motor temperature and one or more thermal sensors for measuring the ambient temperature in the surroundings, environment and/or proximity of the machine/motor.

Measured machine/motor temperature readings may be relatively compared to ambient temperature readings, wherein specific pairs of compared, machine/motor and ambient, temperature readings—may be time aligned readings, or may include a time offset(s) in relation to one another.

According to some embodiments, machine/motor temperature measuring sensors may be located at a position on/within the MMD which is closer to the monitored machine/motor than the position on/within the MMD at which the ambient machine/motor temperature measuring sensors are located.

According to some embodiments, machine/motor temperature measuring sensors may be located at a position on/within the MMD which will—upon connection of the MMD to a monitored machine/motor—be in high proximity to a known heat radiating element of the monitored machine/motor in relation to the proximity of the ambient temperature measuring sensors, or other MMD sensors, to the known heat radiating element of the monitored machine/motor.

According to some embodiments, a temperature comparison logic may calculate ratios between corresponding pairs or groups of machine/motor temperature and ambient temperature readings. Calculated ratios may be compared to one or more thresholds/rules—set defining one or more machine/ motor to ambient temperature ratio values, ratio values combinations and/or ratio values change scenarios.

According to some embodiments, specific temperature ratio values, temperature ratio values combinations and/or ratio values change scenarios—for example: ratio value change rate/direction, ratio value change speed/pace/trend and/or ratio value change acceleration of specific value(s)—may trigger the issuance of corresponding user notifications, wherein a notification may include the temperature ratio values/value—changes detected and/or current or predicted machine/motor condition/event/malfunction/failure associated therewith.

According to some embodiments, an MMD may be functionally/communicatively connected to receive data indicative of the machine's/motor's temperature and/or data indicative of the machine's/motor's ambient temperature from one or more thermal sensors of the vehicle/machine/device which the MMD monitored machine/motor is operating. Received temperature data may substitute, or may be redundant to, the temperature values measured by the MMD's thermal sensors.

For example, car sensors measured outside/external temperature values may be relayed to the MMD as ambient temperature values and relatively compared, by the MMD, to MMD sensors measured machine/motor temperature values.

According to some embodiments of the present invention, an MMD may include one or more electromagnetic sensors for measuring the strength of electromagnetic field(s) generated as a result of the monitored machine's/motor's operation.

According to some embodiments, measured electromagnetic field strength readings may be relatively compared to the torque or spin speed, at fixed/similar work load(s), of the monitored machine/motor. According to some embodiments, measured electromagnetic field strength readings may be relatively compared to the speed, velocity and/or acceleration/deceleration of a vehicle/object being propelled/mobilized by the monitored machine/motor.

According to some embodiments, specific pairs of compared—electromagnetic field strength and, torque, spin speed and/or vehicle speed, velocity, or acceleration/deceleration—may be time aligned readings, or may include a time offset(s) in relation to one another.

According to some embodiments, measured strength, or trends/changes in measured strength over time, of the electromagnetic fields in the proximity of the monitored machine/motor—and optionally under similar machine/motor work load—may indicate or predict electric operation related failures associated therewith. For example, an electromagnetic sensor measured increase in the strength of an electromagnetic field in the proximity of a monitored electric machine/motor may indicate a failure, breakdown, or deterioration of the machine's/motor's windings insulation.

According to some embodiments, any combination electromagnetic sensor(s) measured factors, such as: the movement, spreading, strength, strengthening or weakening scheme over time and/or the like—of magnetic or electric fields on, around, near, in proximity of, or in a specific inter-orientation(s) with, the monitored machine/motor—may be associated with one or more corresponding monitored—machine/motor, current or predicted, failures or operation related events.

According to some embodiments of the present invention, an MMU/MMD may include one or more energy harvesting modules or mechanisms, or machine emission energy harvesters, adapted to convert machine/motor emissions such as vibration movements, heat, electromagnetic fields, acoustic waves, or any other combination of motor/machine emissions—to electric power.

One or more power sources, such as rechargeable batteries, powering respective MMU/MMD sensors, and/or a main/central power source, such as a rechargeable battery supplying power to multiple/all MMU/MMD components, may be recharged using electric power generated through conversion of the monitored machine's/motor's emissions (e.g. vibration movements' kinetic energy) into electric energy.

According to some embodiments, the MMU may include a machine emission energy harvester configured to harvest and convert energy emissions from the monitored machine/motor into electric energy suitable to provide power for MMU operation.

According to some embodiments, the MMU may include at one or more electrical energy storage units including any combination of: (a) a chemical battery; (b) a capacitive type storage device; and/or (c) a storage unit including some combination of the chemical and capacitive field energy storage.

According to some embodiments, the MMU may include a charging controller to electrically charge the electrical energy storage unit(s) with electric energy generated by the emission energy harvester when the generated energy exceeds the energy requirements of the MMU.

According to some embodiments, the energy harvester may be configured to convert into usable electric energy emissions of one or more of the following types: (a) mechanical vibrations; (b) rotational displacement; (c) acoustic fields; (c) electric fields; (c) magnetic fields; and/or (d) thermal emissions.

According to some embodiments, the set of machine emissions sensors may include sensors of one or more of the following types: (a) mechanical vibration sensors; (b) rotational displacement sensors; (c) acoustic sensors; (c) electric field sensors; (c) magnetic field sensors; and/or (d) thermal sensors.

According to some embodiments, at least one of the emissions sensors may be integral with an emissions energy harvester.

According to some embodiments, an emissions sensor configured for a specific emissions type may be integral with an energy harvester configured to harvest energy from emissions of the same specific emissions type.

According to some embodiments, a vibration energy harvesting module may include a Vibration Energy Harvesting (VEH) transduction mechanism, wherein the transduction mechanism or mechanical structure may, for example, take the form of: a Piezoelectric, an Electrostatic, an Electromagnetic, a Cantilever Beam Structure and/or a Mass-on-Spring Structure.

According to some embodiments, the vibration energy harvesting module may optionally further include an input (e.g. vibration/movement signal) conditioning component, an output conditioning component (e.g. AC to DC converter, charging circuits, voltage stabilizer/regulator) and/or an energy storage unit (e.g. a capacitor) for electrically storing harvested vibration energy, for example, when MMD rechargeable battery(ies) are fully charged.

According to some embodiments, a magnetic field energy harvesting module may include a Magnetic Field Harvesting (MFH) induction mechanism, wherein changes in the strength or orientation of the magnetic field generated by the monitored machine/motor changes the magnetic flux and induces an ElectroMotive Force (EMF) on a conductive coil that is part of the MMD's energy harvesting module.

Figure 1A:
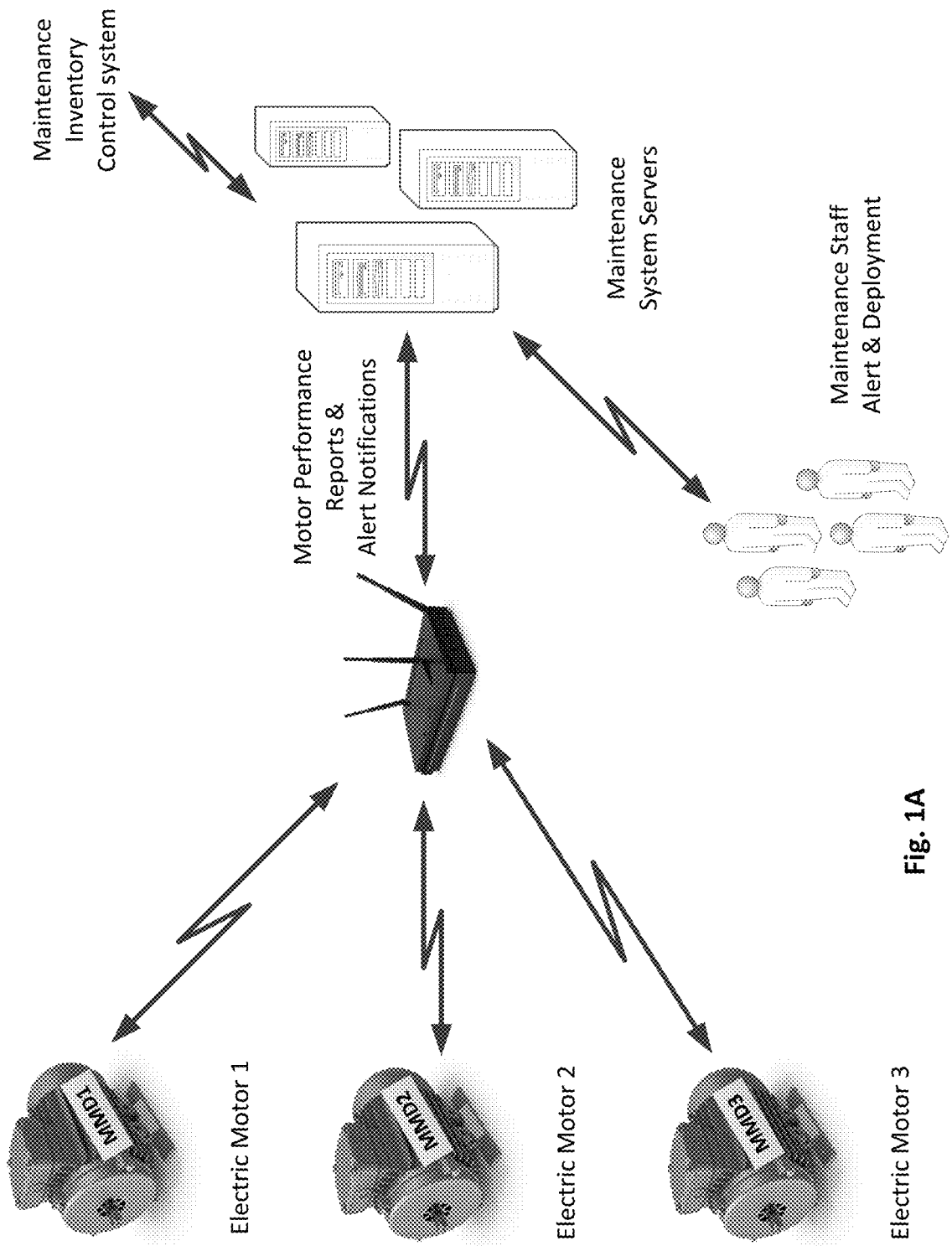
FIG. 1A, is a block diagram of a configuration layout of an exemplary system for monitoring the performance and health of a machine/motor and for powering a machine monitoring unit, in accordance with some embodiments of the present invention, wherein system components and interrelations there between are shown.

Reference is now made to FIG. 1A, where there is shown a block diagram of a configuration layout of an exemplary system for monitoring performance and health of a machine/motor and for powering a machine monitoring unit, in accordance with some embodiments of the present invention.

In the figure, multiple Motor Monitoring Devices (MMDs)/Machine Monitoring Units (MMUs) are shown to be connected and monitoring respective electric machines/motors. Sensor collected monitoring data is analyzed and machine/motor performance reports and alert notifications are communicated through the shown wireless router to machine/motor maintenance system servers. Machine/Motor operation reports and notifications are then analyzed by the servers to: (1) relay alerts and deployment instructions to machine/motor condition/event associated maintenance staff/equipment; and (2) inquire with a maintenance inventory control system—for example, by querying its inventory database—in regard to the availability of parts/components needed for repair of the detected machine/motor condition(s)/event(s) and optionally, automatically purchase, order and/or request delivery of these parts/components.

Figure 1B:
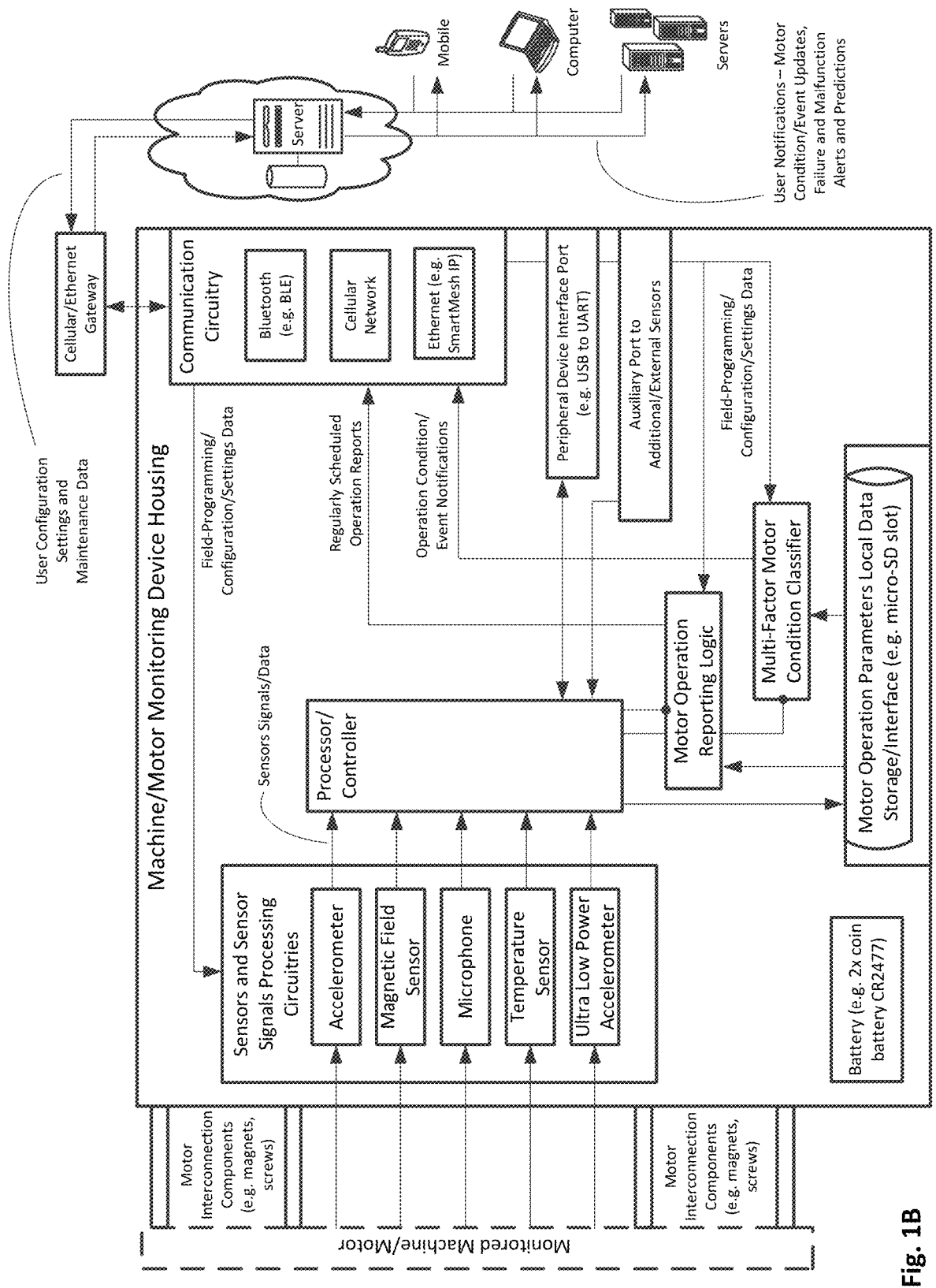
FIG. 1B, is a block diagram of an exemplary system for monitoring the performance and health of a machine/motor and for powering a machine monitoring unit, in accordance with some embodiments of the present invention, wherein system components and interrelations there between are shown.

Reference is now made to FIG. 1B, where there is shown a block diagram of an exemplary system for monitoring performance and health of a machine/motor and for powering a machine monitoring unit, in accordance with some embodiments of the present invention.

In the figure, a motor monitoring device (MMD)/machine monitoring unit (MMU) is shown to be appended, by interconnection components, to a monitored machine/motor. The housing of the device includes a sensors and sensor signals processing circuitries, a processor for processing data streams/parameters that are based on the sensors' collected signals and, for managing the operation of the device's components.

Machine/Motor operation streams/parameters are stored to the shown data storage. The shown reporting logic intermittently generates and communicates machine/motor operation reports to the system server by utilizing the communication circuitries of the device. A multi-factor machine/motor condition classifier analyzes the sensor based data streams/parameters to classify the current condition of the machine/motor—expressed in monitoring sensors data—as matching one or more machine/motor condition/event scenarios/data-sets. Upon detection of a condition match, or a condition prediction match, a corresponding alert/notification is issued and communicated, by utilizing the communication circuitries of the device, to the system server and from there to respective/associated user/maintenance-staff device(s).

User configuration settings, commands and configurations (e.g. sensor sensitivity settings) are communicated from user/maintenance-staff device(s), through the system server, to the MMD.

The shown MMD further includes an auxiliary port for connecting additional sensors, monitoring the machine/motor or its environment, to collect and analyze further machine/motor operation related details. The MMD further includes a device interface port—for connection and use of additional input, output, communication and/or processing peripherals.

Figure 2:
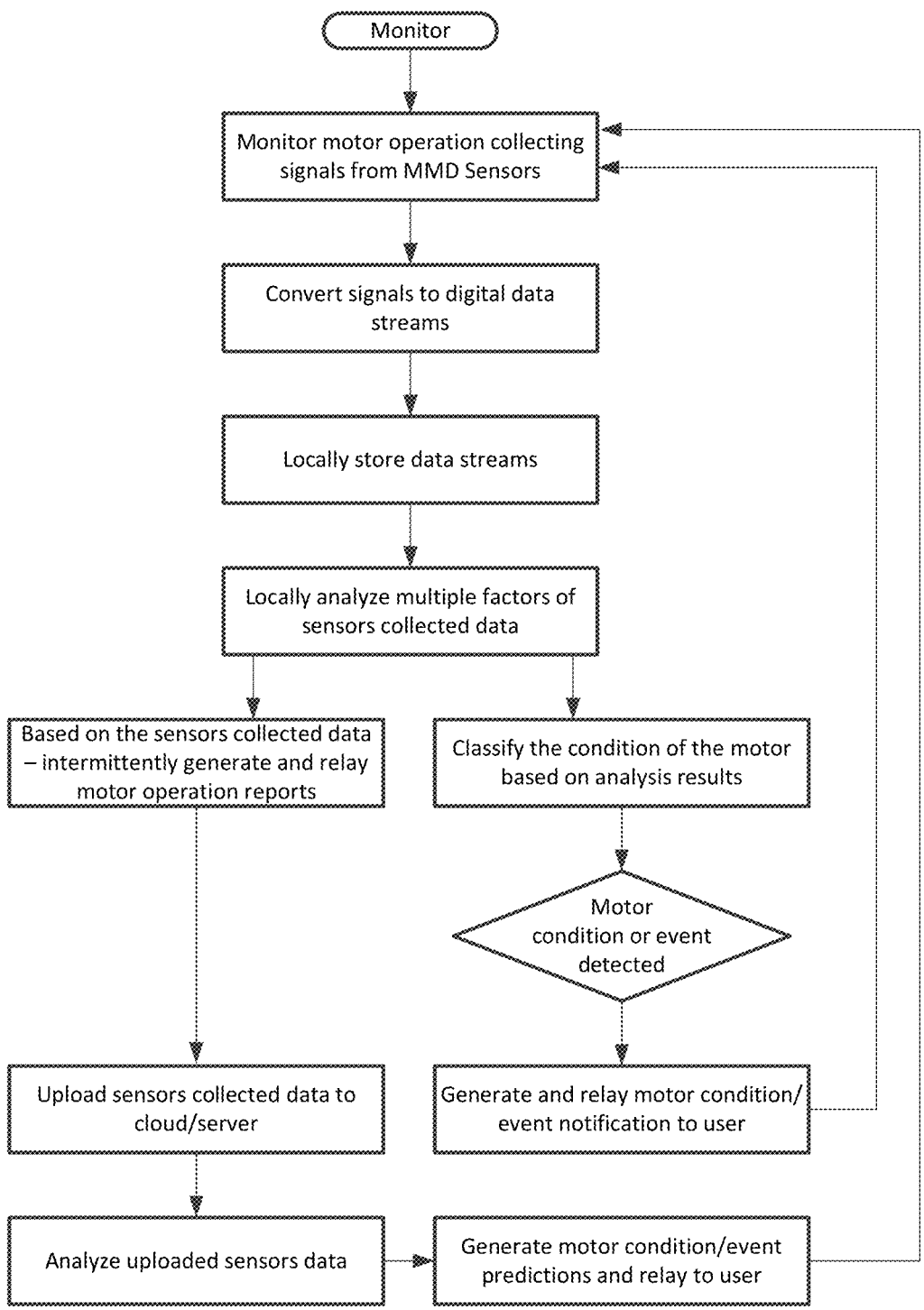
FIG. 2, is a flowchart showing the main steps executed as part of an exemplary process for monitoring the performance and health of a machine/motor and for powering a machine monitoring unit, in accordance with some embodiments of the present invention.

Reference is now made to FIG. 2, where there is shown a flowchart of the main steps executed as part of an exemplary process for machine/motor operation monitoring and for powering a machine monitoring unit.

Shown process steps include: (1) Monitoring machine/motor operation and collecting signals from MMD Sensors; (2) Converting signals to digital data streams; (3) Locally storing the data streams; and (4) Locally analyzing multiple factors of sensors collected data.

Based on the sensors collected data: (5) Intermittently generating and relaying machine/motor operation reports; (6) Uploading sensors collected data to cloud/server; (7) Analyzing uploaded sensors data; and (8) Generating machine/motor condition/event predictions and relaying to user. And/or, based on the sensors collected data: (5') Classifying the condition of the machine/motor based on analysis results; (6') Upon a detection of a machine/motor condition or event; (7') Generating and relaying machine/motor condition/event notification to user.

Reference is now made to FIG. 3A, where there is shown a block diagram of an exemplary system for monitoring performance and health of a machine/motor and for powering a machine monitoring unit, in accordance with some embodiments of the present invention, wherein a thermal sensor measures machine/motor temperature and another thermal sensor measures the ambient temperature in the environment of the machine/motor.

In the figure, machine/motor radiated heat, from the monitored machine/motor, is measured by a machine/motor temperature sensor. Ambient heat in the monitored machine's/motor's environment is measured by the shown ambient temperature sensor. Machine/Motor radiated heat and machine/motor ambient heat measurement signals, or data streams generated based thereon, are relayed to the shown temperature comparison logic, where a ratio/relation/relativity-formula-result between them is calculated (e.g. the quotient of their division).

The ratio/relation/relativity-formula-result calculated is stored to the machine/motor operation parameters local data storage/interface, where it is accessed by: (1) the machine/motor operation reporting logic—as part of intermittently issuing machine/motor condition reports; and (2) the multi-factor machine/motor condition classifier—as part of machine/motor operation monitoring/analysis and the triggering of estimated/determined/predicted machine/motor event/failure notifications, for example, 'the ratio between machine/motor and ambient temperature is rapidly increasing—a machine/motor cooling failure has occurred'.

Reference is now made to FIG. 3B, where there is shown a block diagram of an exemplary system for monitoring performance and health of a machine/motor and for powering a machine monitoring unit, in accordance with some embodiments of the present invention, wherein an electromagnetic field sensor measures the strengths and/or orientations of electromagnetic field(s) generated as part of the monitored machine's/motor's operation.

A machine/motor electromagnetic field data analysis logic continuously/intermittently receives the machine/motor generated electromagnetic field related data and saves it to the machine/motor operation parameters local data storage/interface, where it is accessed by the machine/motor operation reporting logic—as part of intermittently issuing machine/motor condition reports.

The machine/motor electromagnetic field data analysis logic references the shown electromagnetic field characteristics/schemes and associated machine/motor operation events/failures database. The field data analysis logic compares the received sensor measured data to the database records—wherein upon a match between the received data and one or more electromagnetic field characteristic/scheme records stored in the database, details of the respective machine/motor failure(s)/event(s) associated with the received sensor measured data is retrieved.

Retrieved details of the machine/motor failure(s)/event(s) are relayed to the multi factor machine/motor condition classifier, for triggering estimated/determined/predicted machine/motor event/failure notifications, at least partially based thereon, for example, 'the strength of the electromagnetic field generated by the machine/motor is rapidly strengthening—a machine/motor winding insulation breakdown has occurred'.

Reference is now made to FIG. 3C, where there is shown a block diagram of an exemplary system for monitoring performance and health of a machine/motor and for powering a machine monitoring unit, in accordance with some embodiments of the present invention, wherein a vibration energy harvesting module, or an emission energy harvester, utilizes machine/motor operation associated kinetic vibration energy to electrically charge the MMD's battery and batteries powering its specific sensors.

In the figure, the vibration energy harvesting module is shown to be connected to the monitored machine/motor. Machine/Motor vibrations are accordingly conveyed to the harvesting module, wherein the transduction mechanism of the harvesting module converts the mechanical vibration into electrical energy.

The shown voltage regulator regulates the power output from the harvesting module, which power output is supplied to: (1) the charging circuits of the MMD to charge its rechargeable battery; (2) the charging circuits of the sensors—wherein the sensors may be powered either by a single battery, or by multiple batteries one for each sensor; and (3) the energy storage unit for providing electric power at a later time, such as times when the machine/motor is not operating or operating but not generating/providing enough harvestable energy.

Reference is now made to FIG. 4A, where there is shown a block diagram of a first exemplary transduction mechanism, in accordance with some embodiments of the present invention, wherein the vibration energy harvesting module utilizes a piezoelectric based mechanism—an oscillating cantilever that conveys machine/motor vibrations to a piezoelectric material, thereby causing the piezoelectric to exert electric power.

Reference is now made to FIG. 4B, where there is shown a block diagram of a second exemplary transduction mechanism, in accordance with some embodiments of the present invention, wherein the vibration energy harvesting module utilizes an electrostatic based, variable capacitors, mechanism—a monitored machine/motor connection beam conveys machine/motor vibrations to one of two plates, thus changing the distance, or overlap area, between the plates.

Shown horizontal plate movements and/or shown vertical plate movements, respectively change the exposed overlapping area and the separation distance between the two plates. The changes in exposed plate overlapping area and the plate separation distance changes the capacitance causing electrical charges quantity to accumulate/rise and be collected to provide electric power.

Reference is now made to FIG. 4C, where there is shown a block diagram of a third exemplary transduction mechanism, in accordance with some embodiments of the present invention, wherein the vibration energy harvesting module utilizes an electromagnetic induction based mechanism—a conductive coil cutting the shown magnetic field, as the N pole block connected to the monitored machine/motor moves in relation to it, thus developing potential difference between the terminals of the coil.

Reference is now made to FIG. 4D, where there is shown a block diagram of an exemplary magnetic induction mechanism, in accordance with some embodiments of the present invention, wherein the magnetic field energy harvesting module utilizes the changing magnetic field generated by the machine/motor to change the magnetic flux on the conductive coil, thus inducing an ElectroMotive Force on a conductive coil and developing potential difference between the terminals of the coil.

An exemplary system for monitoring performance and health of an electric motor or machine and for powering a machine monitoring unit, in accordance with some embodiments of the present invention, may facilitate preventive and predictive maintenance of motors, motorized vehicle fleets and squadrons, industrial machines, assets, structures and the like.

The exemplary system may be adapted/designed/fitted to provide a wide range of end-user solutions addressing, among others, Condition Based Maintenance (CBM) and predictive maintenance issues—while utilizing, and/or interfacing with, embedded and edge solutions, cloud Artificial Intelligence (AI) and services, Internet of Things (IoT) solutions, Open Platform solutions, etc.

The exemplary system may include: an MMD/MMU having embedded intelligence components for motor/machine fault detection; and smart maintenance components, utilizing cloud artificial intelligence, for fault recognition and associated maintenance action suggestion.

The following are non-limiting examples of operation scenarios of an exemplary system for monitoring performance and health of an electric motor or machine, in accordance with some embodiments of the present invention.

In the examples, two motor operations scenarios are described. The first scenario, wherein imbalance is artificially introduced on the motor shaft with a broken/bad bearing. The second scenario, wherein a hand break is used to simulate the change of operating parameters such as operating speed, load factor, temperature increase, etc. and further, wherein a broken capacitor fault is induced and the capacitor has to be switched on/off.

The MMD is used as a fault indicator. The MMD, based on sensors collected data, creates a signature of the monitored motor and sends the signature as well as the raw data to the server/cloud. The MMD wakes up on schedule and checks the actual operating conditions with the signature of the motor. If no deviation from the signature is detected, the MMD sends a status update (green status) and key operating parameters to the cloud. If an anomaly or a fault is detected, the MMD sends a warning signal (yellow or red), along with raw data, to the cloud.

Cloud AI analyses the raw data (by comparing it with the signature and known/learned failures) to recognize the failure pattern of the motor. Once the pattern of the motor has been recognized (e.g. imbalance, broken capacitor), the AI matches/generates and recommends a containment action and a maintenance plan. Both the containment action and the proposed schedule plan, optionally with the work order, are then sent to a user mobile device(s) (e.g. via SMS, WIFI, Bluetooth).

Once a fault is induced on one of the motors, the containment action and the maintenance plan are sent to a mobile user device(s) (e.g. tablet, smartphone) and a recommendations report—of what needs to be done to fix the issue or avoid similar future breakdowns—is generated and presented to the user. The complete report/work-order serves as a digital assistant that describes the detected failure or warning pattern and recommends likely ways to solve or avoid the problem.

The system's AI functionality is split between: MMD embedded AI utilized as a fault/anomaly indicator and cloud AI for fault recognition and associated actions. Predictive maintenance capabilities/tools may be proprietary, or may leverage or be based—on/combined—with those of cloud service providers (e.g. Microsoft, AWS, MindSphere).

The examples described, details the operation of an optionally open MMD platform with embedded AI and further powered by cloud AI—to facilitate machine/motor maintenance.

Any combination of the following information types may be presented to system users as part of the exemplary operation scenarios described: MMD control and settings interface, MMD derived motor operation conditions related data (e.g. green, yellow, or red—motor status); and/or motor fault containment/remedy and maintenance recommendations.

Reference is now made to FIG. 5A, where there is shown a schematic block diagram of the exemplary system setup executing/implementing the exemplary operation scenarios of the following examples.

In the figure an electric motor equipped with an MMD is shown. From the MMD, condition data of the motor is sent either directly to the SMARTMESH gateway, or through the shown SMARTMESH IP USB manager. The condition data is communicated to the system's server/cloud for analysis, based on which results the system's digital assistant—a web/mobile application on a networked client device(s)—generates and presents user outputs such as: highlights of issues, alerts of technicians triggered or to be, recommends solutions and the like.

Reference is now made to FIG. 5B, where there is shown a schematic table listing various possible outputs of an exemplary system executing/implementing the exemplary operation scenarios of the following examples.

Listed examples of system outputs include: Overview—Central interface, Fully individualized and Granular user roles; Planning—Assets, Preventive work orders and Time and shift planning; Work Orders—Requests, Unplanned, Planned, Predictive; Condition Based Scoring—Retrofit, Analog MMD box and Anomaly detection; Recommendations—Numeric and text analytics and Contextual recommendations; Documentation—Mobile, QR codes, Pictures and Signature; and Reporting—Key Performance Indicators (KPI), Individual reporting and Export.

Example I—Co-Integrated Machine and Structural Health Monitoring and Maintenance Based Thereon A sensor/accelerometer (e.g. MonoDAQ) has/is—utilized—for a comparison between a good and bad bearing in a Fast Fourier Transform (FFT) on the same motor. Raw data as well as FFT data is available.

The good motor bearing is used for bearing signature creation, whereas a bad bearing is used to train the model to recognize the fault "bad bearing". The AI recognizes the bad bearing by comparison of FFT spectra at specific bearing frequencies and makes a suggestion on what should be done to fix the problem.

A first implementation methodology may compare the good and bad spectra, since the bad spectra could have attributed to the fault "bad bearing" in the past and is already saved in the cloud data bank. A second implementation methodology, may compare the good and bad spectra with theoretically calculated and adjusted (if need) bearing frequencies. A combination of the first and second may likewise be utilized.

As a fault begins to develop, the vibration produced by the bearing changes: Every time a rolling element encounters a discontinuity in its path a pulse of vibration results. The resulting pulses of vibration repeat periodically at a rate determined by the location of the discontinuity and by the bearing geometry. These repetition rates are known as the bearing frequencies, more specifically: Ball passing frequency of the outer race (BPFO) for a fault on the outer-race; Ball passing frequency inner race (BPFI) for a fault on the inner-race; Ball spin frequency (BSF) for a fault on the ball itself; and The fundamental train frequency (FTF) for a fault on the cage.

The bearing frequencies are calculated from the bearing geometry. The bearing geometry is available via given bearing type in their respective datasheets—i.e. motor datasheet=>bearing type=>bearing geometry=>BPFO, BPFI, BSF, FTF+Harmonics. The spectra can be compared at points BPFO, BPFI, BSF, FTF+multiple Harmonics.

The system's server/cloud AI/Logic generates an order/report including a combination of the following data records: motor affected—location, ID, type of the motor, etc.; The problem—a bearing in this case; The bearing which is affected—left/right/both; The type of bearing; Availability—in-stock/out of stock; Time to change recommendation; Who to change recommendation; and/or How to change—exact steps. Additionally, a datasheet of the motor is made available on request, including the history on the motor, year, how many years of work, last maintenance steps and/or any other information relevant to the operation of the motor or to the operation of the vehicle/machine which is the subject of its operation. The system's server/cloud AI/Logic further recognizes the OFF and ON status of the motor.

The MMD's integrated sensors/accelerometer (e.g. MonoDAQ) further facilitates the co-integration (or retrofitting) of existing CBM systems into the system's server/cloud AI/Logic while being augmented by AI and Machine Learning (ML) extracting more value from, and optimizing the operation, of those CBM systems.

Example II—Integrated Machine and Structural Health Monitoring and Maintenance Based Thereon The motor of the example has two kind of faults+a motor OFF status, altogether 3 different states.

The first fault/anomaly is introduced by a handbrake. The handbrake changes the speed of the motor, the load factor as well as power consumption. The handbrake can further stop the motor. These changes may be unpredictable and quick, depending on how fast and how strong the handbrake is pulled and released. The MMD operates as a fault/anomaly indicator and sends all the data acquired to the server/cloud as soon as the fault/anomaly has been detected and indicated. As soon as the handbrake has been released and the motor is running as expected and the MMD sends a green/OK sign to the server/cloud.

When working on schedule, the MMD may miss a handbrake manipulation (e.g. if the MMD wakes up every 2 or 5 minutes for acquiring and analyzing the data and the handbrake is manipulated on for a period of 10 seconds the fault/anomaly might be missed). To solve this potential issue the MMD implements the following procedure, or a similar procedure: A first set of sensors/accelerometers (e.g. BMM150 and ID69) are running on schedule (e.g. every 3 minutes for 30 seconds); Another sensor/accelerometer (e.g.

ADXL362) is permanently on; A trigger for vibration amplitude is set; As soon as the threshold has been exceeded (e.g. vibration low), the permanently on sensor/accelerometer triggers the on-going operation of the other sensors for 30 s through which raw data from all the sensors is sent to server/cloud; This may continue until normal motor operation conditions are recognized/indicated by all sensors, the MMD sends a Green/OK sign to the server/cloud and returns to running on schedule.

When unable to recognize fault patterns—for example, in cases when data is not available in real-time, or provided batches—change(s) in the operating conditions such as: frequency, vibration level, magnetic field level and sound pattern, can still be recognized—and a respective statement such as "Operation conditions changing fast" may be issued. Further, an order of a technician to check/fix the motor (including, for example: which motor, its location, what to do, what to do immediately/urgently, etc.) is generated and issued. If/as—soon—as the operation condition has been normalized for a predefined time period (e.g. 5 minutes), the order may be cancelled by the system automatically.

The MMD may accordingly combine scheduled running with periodically permanent and substantially real time monitoring, while retaining a low power consumption, for example, by minimizing the number of co-operating sensors.

The second motor fault introduced is the ON/OFF switching of the run capacitor. This changes the vibration level, sound pattern, as well as the symmetry of the magnetic field. These changes are often clearly defined, yielding a highly probability of correct fault indication(s)/recognition(s). The proposed scenario may be: MMD is running on schedule and should recognize the fault from changing of Peer-to-Peer (P2P) and Root-Mean-Squared (RMS) of raw data and/or the FFT from each of three sensors/accelerometers (e.g. ADXL356, BMM and ID69). As soon as the fault/anomaly has been detected the MMD pushes all the raw data from each sensor to server/cloud. The server/cloud AI compares the motor signature (capacitor ON, the motor is running as expected) with the fault conditions (capacitor OFF, fault/anomaly state), makes a statement in accordance and generates an order/report including a combination of the following data records: motor affected—location, ID, type of the motor, etc.; The problem—a broken run capacitor in this case; The type of capacitor and its relevant parameters; Availability—in-stock/out of stock; Time to change recommendation; Who to change recommendation; and/or How to change—exact steps. Additionally, a datasheet of the motor is made available on request, including the history on the motor, year, how many years of work, last maintenance steps and/or any other information relevant to the operation of the motor or to the operation of the vehicle/machine which is the subject of its operation.

As soon as the capacitor is ON again, the MMD sends a Green/OK status to the server/cloud. The executed/cancelled order for changing the capacitor may be kept for future reference.

In the third status—the motor is OFF. The MMD recognizes the OFF status of the motor and sends a Red/OFF status to the server/cloud. The MMD is thus utilized as a fault/anomaly indicator able to recognize known states of the motor (e.g. ON/OFF or some frequent and known faults). In case of the OFF status, there may be no need to send the raw data to the server/cloud.

According to some embodiments of the present invention, a machine/motor monitoring device/unit (MMD) for monitoring one or more operational parameters of a subject machine of a specific machine type, may comprise: a set of machine emissions sensors, each of which sensors is configured to generate an electric signal indicative of one or more characteristics of a specific emission type produced by the subject machine during operation of the subject machine and sensed by the sensor; communication circuits to enable communication of information derived from the emission characteristics indicated within the electric signal to a server; a controller to: (a) communicate information derived from the emission characteristics indicated within the electric signal to a server according to a normative operation regime, (b) compare emission characteristics indicated within the electric signal against stored reference emission characteristics which are specific to the subject machine and (c) to trigger an alert notification type communication upon detection of a notable deviation of sensed emission characteristics relative to reference emission characteristics; and a power-source to provide electric power to the set of sensors, controller and communication circuits.

According to some embodiments, subject machine specific emission characteristics references may be set or adjusted based on one or more of: (a) references values provided for the specific machine type; (b) emissions characteristics previously sensed for the specific machine; (c) a machine lifecycle simulation mathematical-model for the specific machine type; (d) empirical measurements from other monitored machines of equivalent machine types; and (e) references values updated to the unit through the communication circuits.

According to some embodiments, detection of a notable deviation of sensed emission characteristics relative to reference emission characteristics may include one or more of: (a) one sensed emission characteristic deviating from its corresponding reference beyond a standalone deviation threshold level associated with the sensed emission characteristic; and (b) each of a specific combination of two or more sensed characteristics deviating from their respective references beyond respective adjusted deviation threshold.

According to some embodiments, an adjusted deviation threshold for a specific sensed characteristic may be at least partially calculated based on a sensed deviation of at least one other sensed characteristic.

According to some embodiments, the set of sensors may include at least one sensor, which at least one sensor is of a type selected from the group consisting of: (a) accelerometer; (b) orientation sensor; (c) vibration sensor; (d) acoustic microphone; (e) contact temperature sensor; (f) ambient temperature sensor; (g) electric field sensor; (h) magnetic field sensor; (i) gas pressure sensor; (j) location sensor; (k) proximity sensor; (l) humidity sensor; (m) image sensor; and (n) intrusion sensor.

According to some embodiments, the machine monitoring device/unit may further include one or more external sensor signal interfaces to receive signals from external sensors.

According to some embodiments, the one or more external sensor signal interfaces may be adapted to receive signals from external sensors of a type selected from one or more of: (a) a current sensor; (b) a voltage sensor; (c) a torque sensor; and (d) an RPM (motor Rounds Per Minute) sensor.

According to some embodiments, detection of a notable deviation of sensed emission characteristics relative to reference emission characteristics includes: (a) detection of a continuing trend in the deviation of a specific emission characteristic; (b) detection of a rate of change in a specific sensed emission characteristic; (c) a combination of trends and rates/change-rates relating to two or more sensed emission characteristics.

According to some embodiments, trends and rates relating to two or more sensed emission characteristics may include a combination of voltage drops and changes in electric current levels.

According to some embodiments, detection of a continuing trend in the deviation of a specific emission characteristic may include increasing magnetic field fluctuation level measurements.

According to some embodiments, trends and rates relating to two or more sensed emission characteristics may include a continuous trend in the value of the ratio between the machine's input current and the sensed magnetic field strength.

According to some embodiments, machine emitted vibration amplitude or frequency values may be calculated based on a combination of outputs from both an accelerometer and a microphone.

The subject matter described above is provided by way of illustration only and should not be constructed as limiting. While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A machine monitoring unit (MMU) for monitoring one or more operational parameters of a machine of a specific machine type during operation, said unit comprising:
   (i) a set of machine emissions sensors, each of which is configured to convert machine emission of a specific type generated by the machine during machine operation into an electric signal containing information of the respective converted emission, said set of machine emissions sensors includes sensors of types selected from a group comprising: (a) mechanical vibration sensors; (b) rotational displacement sensors; (c) acoustic sensors; (d) electric field sensors; (e) magnetic field sensors; and (f) thermal sensors,
   (ii) communication circuits to enable communication of the information of the respective converted emission within the signal to another device; and
   (iii) a machine emission energy harvester configured to harvest and convert energy emissions from the monitored machine into electric energy to provide power for MMU operation.

2. The MMU according to claim 1, wherein said MMU further includes at least one electrical energy storage unit selected from a group consisting of: (a) a chemical battery; (b) a capacitive type storage device; and (c) a storage unit including some combination of the chemical and capacitive field energy storage.

3. The MMU according to claim 1, wherein said energy harvester is configured to convert into usable electric energy emissions of one or more of the following types: (a) mechanical vibrations; (b) rotational displacement; (c) acoustic fields; (d) electric fields; (e) magnetic fields and (f) thermal emissions.

4. The MMU of claim 1, wherein at least one of said machine emissions sensors is integral with an emissions energy harvester.

5. The MU of claim 1 wherein the at least one of said machine missions sensors configured for a specific emissions type is integral with an energy harvester configured to harvest energy from emissions of the specific emissions type.

6. The MMU of claim 2, further comprising a charging controller to electrically charge said electrical energy storage unit with electric energy generated by said emission energy harvester when the generated energy exceeds the energy requirements of the MMU.

* * * * *